March 2, 1965  C. E. STRAIN  3,171,514
LIMIT MEANS IN AN ELECTRICALLY CONTROLLED BRAKE
Filed June 26, 1962
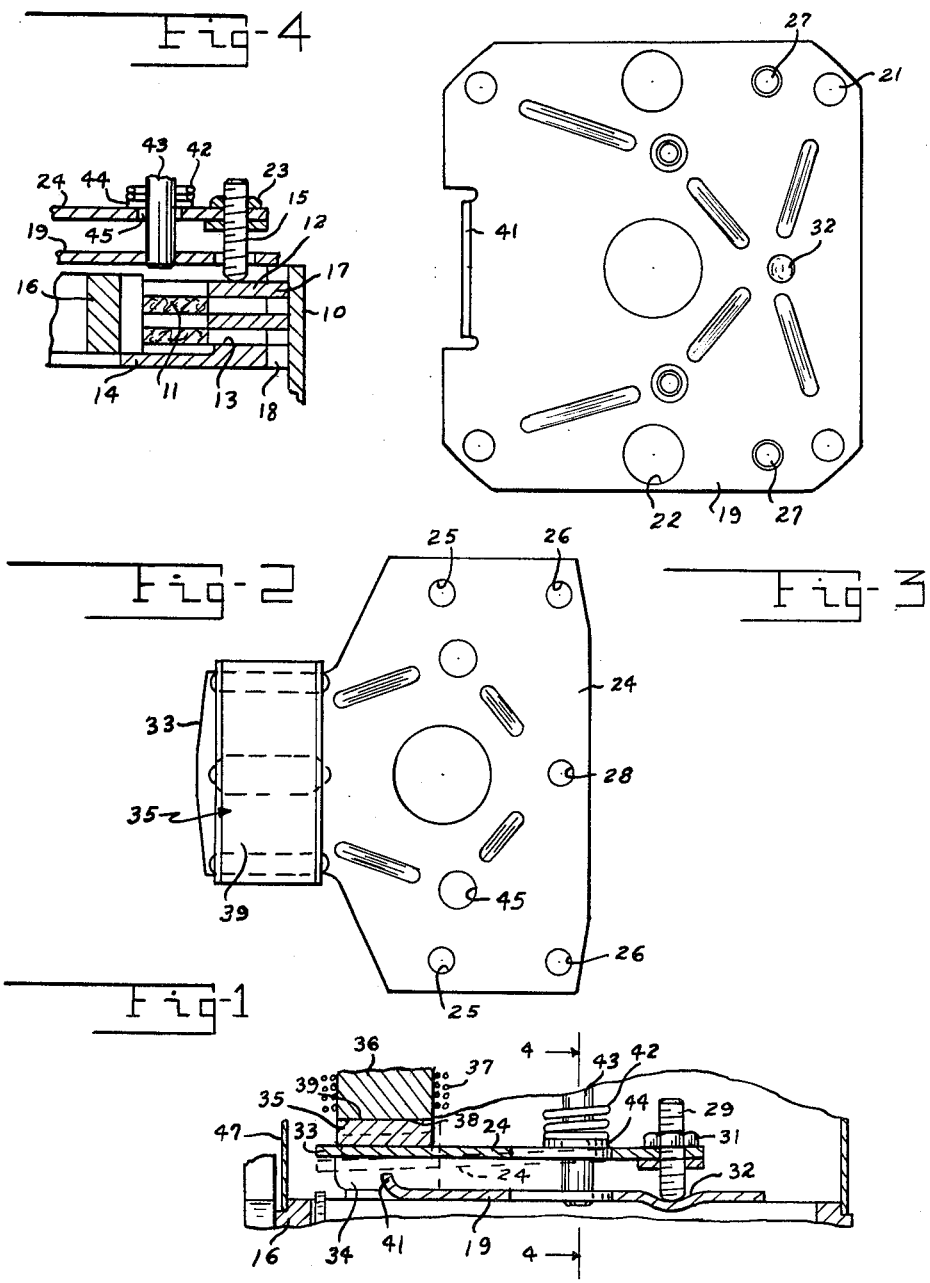
INVENTOR
CHARLES E. STRAIN
BY Tom Walker
ATTORNEY United States Patent Office 3,171,514
Patented Mar. 2, 1965

3,171,514
LIMIT MEANS IN AN ELECTRICALLY
CONTROLLED BRAKE
Charles E. Strain, Union, Ohio, assignor to The Reliance
Electric & Engineering Company, Cleveland, Ohio, a
corporation of Ohio
Filed June 26, 1962, Ser. No. 205,424
3 Claims. (Cl. 188—171)

This invention relates to disc brakes and the like of the spring applied electrically released type, and particularly to improvements in the brake actuating mechanism assuring continuing proper operation of electromagnetic release means therein.

Brakes of the kind described conventionally make use of a friction disc and separator ring assembly as the braking means, with the brake being applied by continuously acting spring means tending to compress such assembly and being released by the action of an electromagnet retracting an armature against the urging of the spring means. As the friction discs wear, the air gap between the electromagnet and its armature tends to increase, and, if unchecked leads to improper brake operation and burnout of the energizing coil of the electromagnet.

The object of the invention is to simplify the construction as well as the means and mode of operation of brake mechanisms, whereby such mechanisms may not only be economically manufactured, but will be more efficient and satisfactory in use, adaptable to a wide variety of application, and be unlikely to get out of order.

A further object of this invention is to obviate such a condition, it being contemplated to provide a maximum permitted aid gap between the electromagnet and armature irrespective of brake wear.

Another object of the invention is to utilize limit means as described as a wear indicator pointing to a need for brake adjustment.

A further object of the invention is to provide control means as described in a unitary brake actuating means.

A further object of the invention is to provide an electric motor brake possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a fragmentary view in longitudinal section of brake actuating means in an electric motor in accordance with the illustrated embodiment of the invention, the parts being shown in full lines in the position assumed under conditions of brake release or during energizing of the electromagnetic coil means.

FIG. 2 is a detail top plan view of an armature plate comprised in the brake actuating means.

FIG. 3 is a detail top plan view of a mounting plate; and

FIG. 4 is a fragmentary view in cross-section of the motor brake and of the pressure applying means for activating the brake.

Like parts are indicated by similar characters of reference throughout the several views.

Although generally applicable to brakes, friction clutches and the like, the invention is here disclosed as embodied in a brake for an electric motor. A housing section 10 of the motor receives therein an assembly of stacked friction discs 11 and separator rings 12. These are in alternating relation, the innermost element being a disc 11 seated on an annular land 13 on a transverse partition wall 14 of the housing section 10. The outermost element 12 is a separator ring and it is adapted to be engaged on its upper surface by a pair of studs 15 (one shown). A downward thrust by the studs 15 compresses the friction discs and separator ring assembly. The friction discs 11 are constructed and arranged to rotate with the motor shaft, as by being mounted on a common hub 16 keyed or otherwise secured to such shaft. The separator rings 12 have projecting tongues 17 engageable in grooves 18 of longitudinal extent formed in the housing section 10. The discs 12 are thus held against rotation, and, in response to the application of a compression force as described, exert a clamping pressure upon discs 11 braking the rotation of hub 16. Upon release of the clamping pressure applied by studs 15 the discs 11 are able to rotate freely and the hub 16 accordingly is released for rotation.

Studs 15 as shown are a part of a brake actuating unit comprising a mounting plate 19 secured to the outer end of housing section 10 in a manner substantially to close the housing recess receiving the friction disc and separator ring assembly. Mounting plate 19 is flat and generally square in configuration. Corner openings 21 provide bolt holes for fastening the plate to the housing. Near each side edge of the mounting plate, and intermediate the ends thereof is a through opening 22 provided for passage of a stud 15 therethrough. Each of the latter is fixed, by means including a nut 23, to an armature plate 24 at one side edge thereof. Armature plate 24 is in generally superposed spaced relation to the mounting plate 19 and has openings 25 therethrough for passage of the studs 15. Other openings 26 therein are constructed to receive with a loose fit upstanding studs 27 on the mounting plate 19. Further, the armature plate 24 has at one end thereof a through opening 28. A threaded stud 29 passes through opening 28 and is secured to the armature plate 24 by means including a nut 31. Extending through and beyond armature plate 24, one end of the stud 29 is seated in a shallow concavity 32 in mounting plate 19. The arrangement is one pivotally positioning the armature plate 24 on the mounting plate 19 with the construction being such that the armature plate may pivot relatively to the mounting plate.

That end of the armature plate 24 opposite that mounting stud 29 extends as a tongue 33 between a pair of upstanding brackets 34 (one shown) secured at their lower ends to the mounting plate 19. On the projecting tongue portion 33 of the armature plate is a lamination assembly 35 acting as an armature. The upstanding brackets 34 support between them, in a suspended relatively elevated position, a pole unit 36 on which is an energizable coil 37. Unit 36 presents a magnet face 38, with the parts so oriented as to place such face in an aligned relation to a mating upturned magnet face 39 on the armature 35. Armature plate 24 and armature 35 thereon achieve their full line position as shown in FIG. 1 by an energizing of the coil means 37. Armature 35 is thereby attracted by the pole unit 36, causing armature face 39 to engage and hold fast to pole face 38. The engaged position of the armature and pole unit defines one extreme of pivotal motion of the armature plate 24, the other or opposed extreme being defined by an upstruck lip 41 on the mounting plate 19.

The movement of the armature plate 24 to engage armature 35 with pole unit 36 is accomplished against the urging of spring means comprising a pair of compression springs 42 (one shown). Each spring 42 surrounds a stud 43 and suitably reacts against such stud at its upper end. Each spring 42 is based on a collar 44 seated on armature plate 24. Each stud 43 projects through a respective opening 45 in the armature plate 24 and extends beyond such armature plate to the mounting plate 19 where it is anchored or made fast in a suitable manner. The stud 43 being anchored in mounting plate 19, the expansive action of the springs 42 is exerted in a direction to urge the armature plate 24 toward a seat on stop 41 or in a direction to separate the magnetic faces 38 and 39. The urging of spring means 42 is continuous. The attraction exerted by pole unit 36 is sufficient to overcome the spring means so that when coil 37 is energized the armature plate rises against the urgings of springs 42 and armature 35 strikes the pole unit 36 and remains so engaged as long as the coil 37 remains energized. Upon deenergizing of the coil, however, the control over movements of the armature plate is returned to the spring means 42 and the armature is again moved toward a seat on stop 41.

The force exerted by spring means 42 represents the braking force. Inward motion of the armature plate as described causes the studs 15 carried thereby to engage and compress the friction and separator ring assembly in housing section 10 with a consequent braking action as described. Retraction of the armature plate in response to energizing the coil 37 raises the studs 15 and accordingly releases the applied pressure, in turn releasing or disabling the brake.

Travel of the armature plate 24 toward the stop 41 or in a direction to apply the braking force, normally is limited by the friction disc and separator ring assembly. Normally, therefore, a braking operation finds the armature 24 assuming a position substantially as indicated in dotted outline in FIG. 1 wherein the armature plate is short of contact with the stop 41. As the friction discs wear, however, the pivotal extreme of movement of the armature plate with the brakes on or applied gradually approaches stop 41 until the armature plate finally is limited thereby. In the presence of the stop a positive limit to the separating motion of the armature 35 is defined whereby to achieve a maximum permitted air gap between the faces 38 and 39. If the described air gap between the magnet faces is not limited the gap will increase constantly due to wear of the discs. Finally, the force of attraction between pole unit 36 and armature 35 becomes insufficient to overcome the spring means 42. Then the electromagnet fails to operate and coil 37 may burn out.

Additionally the stop 41 serves as a wear indicator. When the armature 24 limits against stop 41 the brake operates with a reduced effectiveness, indicating that adjustment is in order. Thus while the spring means 42 is adapted to and does compensate for wear in the disc brake assembly it is undesirable that this compensation be continued either to the point of permitting excessive wear or to the point of undesirably lengthening the air gap between magnet faces 38 and 39. The stop 41 precludes both possibilities.

Adjustment of the brakes may be effected in any convenient manner, for example, by adjusting the studs 15 to project a longer portion thereof through and beyond the armature plate. The brake actuating mechanism is comprised in a unit, as described, installed on one end of the housing section 10 and enclosed by a relatively light removable cover 47 for convenient access.

The cooperative relationship here shown between a mounting plate 19, an armature plate 24 and electro-magnetic means is disclosed and claimed in a co-pending application by Robert L. Wolfe, Serial No. 205,435, filed June 26, 1962 for Brake.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A control system for a magnetically released motor brake or the like including a fixed mounting plate having a pole unit presenting a magnet face supported in overlying spaced relation thereto, a normally spaced armature plate having means pivotally mounting it to said mounting plate and including a portion extending in underlying relation to said magnet face, an armature on said extending portion of said armature plate opposed to said magnet face, means interconnecting said plates to normally provide an air gap between said armature and said magnet face and means on said mounting plate underlying said armature plate to establish a maximum permitted air gap.

2. The structure as set forth in claim 1 characterized by brake applying means fixed to project from said armature plate and in the braking position thereof normally preventing contact of said armature plate with said means on said mounting plate which establishes the maximum permitted air gap.

3. The structure as set forth in claim 1 characterized in that said means on said mounting plate has the form of an upstruck lip formed integral with said mounting plate and projected to underlie said magnet face and the intermediately disposed armature.

References Cited in the file of this patent
UNITED STATES PATENTS

| | | |
|---|---|---|
| 2,026,513 | Trombetta | Dec. 31, 1935 |
| 2,215,909 | McWhirter et al. | Sept. 24, 1940 |
| 2,273,328 | Miller | Feb. 17, 1942 |
| 2,775,320 | Vallen | Dec. 25, 1956 |